Patented Mar. 18, 1947

2,417,493

UNITED STATES PATENT OFFICE 2,417,493

METALLURGICAL BRIQUETTE AND METHOD OF MAKING SAME

Frank Holz, Cleveland, Ohio

No Drawing. Application May 14, 1943,
Serial No. 487,067

12 Claims. (Cl. 75—3)

In the metallurgy of iron and steel, the problem has heretofore been presented of utilizing iron bearing materials, such as the fines of natural iron ore, the iron oxide-containing flue dust and sludge, which otherwise represent waste products. In the reduction of iron ore to metal in the blast furnace, as well as in the refining of steel in the open hearth furnace, lump ore is preferably used as a raw material source, or treating agent, because it is a physical impossibility to introduce the relatively fine particles, as such, of ore fines, flue dust and sludge into such metallurgical processes. As a consequence, natural iron ore fines, as well as the iron oxide-containing by-products from blast furnace operations, such as flue dust and sludge, have heretofore been discarded and their iron content becomes lost as a source of raw material. This loss has amounted to very considerable proportions in the past.

Numerous attempts have been made to agglomerate these fine particles of iron bearing material by mixing them with a binder and forming into briquettes. Tar, pitch, molasses, silicate of soda or water glass, glucose, hydraulic cement, such as Portland cement, have all been tried out as binding agents in making such briquettes. However, these previous attempts possess certain disadvantages and meet with practical difficulties when commercial adaptation thereof has been attempted. The ideal metallurgical briquette for use in the iron and steel refining processes should possess the property of resisting spalling, shattering, decomposition and thermal disintegration at high temperatures, otherwise the disintegration of the briquettes charged to a blast furnace, for example, merely results in the blowing of the fine particles out through the top of the blast furnace with an incident increase in the flue dust and sludge waste. A satisfactory and successful briquette for commercial use should possess sufficient compression and impact strength so that it can withstand the rigorous handling to which it is subjected in conveyors, loading and charging devices. Such strength should be imparted to the briquette not only immediately upon its fabrication, but during its subsequent period of handling and storage prior to use. Otherwise, the briquettes upon being first molded cannot be conveniently handled, stacked or piled, without crushing. Since the raw materials for blast furnace and open hearth furnaces are customarily piled in the open, a satisfactory briquette must also be resistant to leaching action, viz.: its binder must be capable of withstanding the washing out action of water. The use of incombustible binding agents should also be kept to a minimum if a satisfactory briquette is to be made, otherwise the slag content of the melt is increased.

Portland cement has heretofore been used in the making of metallurgical briquettes, but such briquettes have been found subject to the disadvantage of undergoing thermal disintegration at the temperatures encountered in blast furnace and open hearth operations. In my co-pending application, Serial No. 440,718 filed April 27, 1942, I have disclosed a briquette made from iron ore, flue dust and sludge with a binder of water solutions of molasses and silicate of soda. Such briquette is capable of withstanding thermal disintegration of temperatures on the order of 2500°–3000° F., but it requires a drying period of about fifteen minutes or so after molding, before it can be handled or stacked. A briquette made with Portland cement as the binding agent, and in which about 7% by weight or more of Portland cement is required, in addition to being subject to thermal disintegration, must stand for a period of about eight hours before it can be handled or stacked.

The control of the moisture content of the briquette is of especial importance. Not only the iron oxide raw material contains an appreciable amount of moisture, but also the addition of more water to the briquette through the medium of the binding agent increases the ultimate moisture content of the finished product which is to be charged or fed to the blast furnace or open hearth. If such moisture content is too high, difficulty will be encountered in molding the briquettes, and also in the use of the briquettes due to the generation of an excessive amount of steam.

I have now made the discovery that the incorporation of a small amount of Portland cement, viz., about 2–5% by weight on the basis of the iron ore, flue dust or sludge, together with a water solution of the adhesive binding agent, such as molasses or silicate of soda, unexpectedly results in a briquette which has a self-sustaining strength sufficient to withstand handling and stacking immediately after molding, and in addition is capable of withstanding thermal disintegration at temperatures of 2500° F. and above. Thus, the normally expected disadvantages of using Portland cement have contrariwise resulted in advantages, according to the teachings of my present invention.

I have also discovered that the moisture content of a metallurgical briquette is of a critical nature. For satisfactory commercial operation, the ultimate water content should not exceed 18% by weight on the basis of the iron ore, flue dust or sludge present. If the iron ore, flue dust or sludge has an initial water content approaching this limit, it must first be subjected to a dehydrating treatment to a value below this final upper limit of 18%, so as to accommodate the addition of the water content of the adhesive binder.

A further advantage of my invention is that the briquette produced thereby is not subject to water leaching action, and hence it retains its original strength during storage in the open weather.

My invention, therefore, achieves the previously indicated and highly desired objective of a metallurgical briquette for use in iron and steel refining processes, which is not subject to thermal disintegration at high temperatures, has an incipient and continuing structural strength throughout its life, and contains a minimum of non-combustible binding agents, which results in a minimum addition to the slag.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

More particularly describing my invention, I first mix an iron bearing material or iron oxide consisting of natural iron ore fines, or flue dust, or ore sludge, or all of them, with 2–5% by weight of Portland cement. This mixture is made in the dry state. If the iron ore, flue dust or sludge has an initial moisture content of above 14% by weight, I subject such material to a heat drying process (as hereinafter described in the examples following).

Next, I prepare a water solution of molasses in the proporotion of one gallon of molasses to 2–20 gallons of water. The amount of water used is dependent upon the character and relative coarseness of the iron ore, flue dust or sludge particles, the greater proportion of water being employed where a finer particle size is encountered. Some iron ores are of a relatively more "sticky" or adhesive character than others, and hence the greater proportion of water in the molasses-water solution can be employed in such instances.

Silicate of soda of 40–45° Bé. concentration and having an average weight of 12 lbs. per gallon may be used in partial or entire substitution as an adhesive for the molasses. The proportion of such silicate of soda to water will be the same as in the case of molasses, viz., one gallon to 2–20 gallons of water. However, I prefer molasses because silicate of soda does not undergo a complete combustion. Equivalent sugary substances may be used in place of the molasses, but the latter commends itself due to its commercial availability and cheapness.

I then mix the first prepared dry mixture of iron ore fines, flue dust, sludge and Portland cement with the water solution and molasses so that resultant mixture has the consistency of damp sand.

The amount of adhesive-water solution in this mixture is primarily dependent upon the initial moisture content in the iron ore fines, flue dust or sludge and the water content of the added water solution. The important criterion is that the total moisture content of the resultant mixture be not over 18% by weight of the iron ore fines, flue dust or sludge.

The following table sets forth the range proportions of the several constituents of my briquetting mixture.

|  | Parts by weight | Per cent by weight on iron ore basis |
|---|---|---|
| Dry mixture: |  |  |
| Iron ore, flue dust, sludge | 1,000 |  |
| Moisture content | 40–140 | 4–14 |
| Portland cement | 20–50 | 2–5 |

|  | Parts by volume | Parts by weight | Parts by weight, dry mixture basis | Per cent by weight, iron ore basis |
|---|---|---|---|---|
| Adhesive solution: | Gallons |  |  | Per cent |
| Molasses | 1 | 12 | 31¼–156¼ | 0.21–6.5 |
| Water | 2–20 | 16.7–166.7 |  | 1.9–14 |

Total water content range, iron ore basis, 5.9–18%.

It will be noted that the maximum amount of water in the adhesive solution is 14% by weight on the iron ore, etc., basis, so that when an adhesive solution of such water content is mixed with the dry mixture of Portland cement and iron oxide material having the minimum of 4% moisture, the resultant mixture will be within the upper limit of 18% water content.

The resultant mixture is then fed to a briquetting press, subjected to a molding pressure on the order of 500–2000 p. s. i. for a period of less than one minute, and the resultant briquettes stripped from the mold then possess sufficient inherent strength to be immediately handled, dropped on a conveyor, or stacked. These briquettes can be charged to a blast furnace without further treatment. However, in the case of using the briquettes in an open hearth furnace, the water content is reduced to ½% to 2% by weight on the basis of the iron oxide material present by subjecting them to oven drying at temperatures of 150–500° F.

The following examples will serve to explain in detail to those skilled in the art the manner of practicing my invention and will readily enable them to understand same:

*Example 1*

One thousand pounds of a "sticky" Mesabe range iron ore fines are heated in a drying oven to reduce the moisture content to 12–14% by weight and are then mixed with 30 lbs. of Portland cement. One gallon of "blackstrap" molasses, average weight 12 lbs./gal., is then mixed with 15 gallons of water. The latter solution then consists of 8.7% by weight of molasses and 91.3% by weight of water. 44 lbs. of the molasses-water solution is mixed with the previously prepared mixture of iron ore and Portland cement, corresponding to a ratio of about 0.7 oz. avoirdupois of solution per pound of iron ore. The resultant mixture is then of a dough-like consistency. It contains 3% Portland cement, 0.38% molasses and 16-18% water, all percentages given being by weight on the basis of the iron ore present. The damp mixture is then introduced to a briquetting press, where under a pressure of 2000 lbs. per square inch it is molded into pillow-shaped briquettes, averaging about 105 gms. each in weight, 1¾ inch square, and 1⅜ inch thick. Immediately upon discharge from the press, these briquettes can be loaded on to a conveyor, shoveled, piled into a stack and subjected to similar rigorous handling. These briquettes can be stored in a stock pile in the open weather, and without further treatment, are charged to a blast furnace.

Tests upon the so produced briquettes showed that they were able to sustain a crushing pressure of 250 lbs. and that they had an impact strength sufficient to permit them to be dropped from a height of 6 ft. onto a steel plate before shattering. On being tested for thermal disintegration, it was found that these briquettes could be heated to a temperature of 2400° F. for approximately 24 hrs. without displaying any spalling, shattering or disintegration. On being rapidly heated to 2500° F. in about 5 minutes time, the briquettes likewise failed to show any spalling or thermal shattering. At temperatures above 2350° F., the briquettes merely became soft and plastic, but did not fracture or fall apart.

On soaking these briquettes in water, and then withdrawing excess moisture under vacuum, the sample so treated showed a greater impact strength than before, viz., they could be dropped from a height of 78 inches before shattering.

Example 2

The molded briquettes from the briquetting press in Example 1 were placed in a drying oven, heated to a temperature of 500° F. for a period of 15 minutes. The resultant briquettes upon analysis then showed a moisture content of 1.81% by weight. These latter briquettes were then used as "charge ore" in an open hearth furnace; viz: loaded on the bottom of the furnace below a layer of scrap metal. Because of the low moisture content of these briquettes, a greater charge of them could be used than in the case of lump ore or briquetted ore having a relatively high moisture content, without displaying any explosive action due to the generation of an excessive amount of steam. This results in a decrease in the scrap metal charge required per pound of product steel.

Example 3

The mixture from Example 1 was fed into a briquetting press, where, under a pressure of approximately 500 lbs. per square inch exerted for less than one minute time, it was molded into briquettes averaging 50 lbs. in weight and measuring 12 inches by 7 inches by 6½ inches with two 1½ inch holes through the middle. Immediately after discharge from the briquetting press molds, these 50 lb. briquettes have sufficient self-sustaining strength to be lifted on to a conveyor, and stacked one on top of the other six high without crushing the bottom-most briquettes.

These 50 lb. briquettes, upon being heated in a drying oven at 500° F. for approximately one hour, showed a moisture content of less than 2% by weight and were ideally suited for "feeding" into the open hearth furnace, viz: being thrown into the molten bath of metal and slag in such a manner as to break through the upper slag layer.

Example 4

Hot flue dust at a temperature on the order of 800°-1000° F. and sludge having a moisture content of 30-40% by weight, both derived from a blast furnace operation utilizing Texas ores were piled in "sandwich" fashion in equal amounts, one on top of the other. After cooling, it was found that the sensible heat of the hot flue dust had driven off sufficient moisture of the wet sludge to produce a resultant moisture content of 4 to 6% in the mixture of flue dust and sludge. 1000 parts by weight of this resultant mixture of flue dust and sludge were then mixed with 30 parts by weight of Portland cement. An adhesive binder solution mixed in the proportion of one gallon of blackstrap molasses (average weight 12 lbs. per gallon) and 2 gallons of water were then made up and mixed with the flue dust-sludge-Portland cement mixture in the proportion of 2½ oz. per pound, or a total of 156¼ parts by weight of adhesive solution. The resultant mixture then contained 3% Portland cement, 6½% molasses and 13-15% total water, all percentages being by weight on the basis of the original, dried flue dust and sludge mixture.

The resultant mixture was then made into briquettes as hereinabove described in Examples 1, 2 and 3, and were found to possess equivalent physical properties.

Example 5

Hot flue dust of a temperature on the order of 800-1000° F. and wet sludge having 20-40% moisture content, both derived from a blast furnace charged with Mesabe ore were piled together and dehydrated as in Example 4 above, producing a resultant moisture content of the mixture of 4-6%. 1000 parts of this mixture were then mixed with 30 parts by weight of Portland cement.

An adhesive binder solution made up in the proportion of one gallon blackstrap molasses to 15 gallons of water was then mixed with the first prepared flue dust-sludge-Portland cement mixture; 125 parts by weight of such molasses-water solution being employed. This corresponded to a ratio of 2 oz. of adhesive solution per pound of flue dust and sludge. The resultant mixture then contained 3% Portland cement, 1.1% molasses and 12-14% water, all percentages last given being by weight on the basis of the dried flue dust and sludge mixture.

The resultant mixture was then made into briquettes as hereinabove explained in Examples 1, 2 and 3, the so produced briquettes having equivalent physical properties and uses.

Other modes of applying the principle of my invention may be employed instead of the one explained, change being made as regards the composition and method herein disclosed, provided the ingredients or steps stated by any of the following claims or the equivalent of such stated ingredients or steps be employed.

I therefore particularly point out and distinctly claim as my invention:

1. A metallurgical briquette capable of withstanding temperatures of 2500° F. and above without disintegration, comprising an iron oxide selected from the group consisting of natural iron ore fines, flue dust and sludge, 2-5% Portland cement, 0.21–6.5% of a water soluble adhesive selected from the group consisting of molasses and silicate of soda and 0.5–18% water, such percentage amounts being by weight on the basis of iron oxide present, to form a bond setting slowly enough to allow briquetting but then giving initial strength in the briquette.

2. A metallurgical briquette, self-sustaining and capable of being handled and transported immediately after molding, and of withstanding temperatures of 2500° F. and above without disintegration, comprising an iron oxide selected from the group consisting of natural iron ore fines, flue dust and sludge, 2–5% Portland cement, 0.21–6.5% of a water soluble adhesive selected from the group consisting of molasses and silicate of soda and 0.5–18% water, such percentage amounts being by weight on the basis of the iron oxide present, to form a bond setting slowly enough to allow briquetting but then giving initial strength in the briquette.

3. A feed ore briquette for open hearth furnaces comprising an iron oxide selected from the group consisting of natural iron ore fines, flue dust and sludge, 2–5% Portland cement, 0.21–6.5% molasses, and less than 2% water, said percentages being by weight on the basis of the iron oxide present, to form a bond setting slowly enough to allow briquetting but then giving initial strength in the briquette.

4. An iron ore briquette consisting of a mixture of 1000 parts by weight of iron oxide fines having 4–14% by weight moisture content, 20–50 parts by weight Portland cement, and 31¼–156¼ parts by weight, on the basis of said first-named mixture, of molasses and water, the molasses being present in the amount of one gallon to 2–20 gallons of water, to form a bond setting slowly enough to allow briquetting but then giving initial strength in the briquette.

5. An iron ore briquette consisting of a mixture of 1000 parts by weight of iron ore fines having not over 14% by weight moisture content, 30 parts Portland cement, and 44 parts of a mixture of "blackstrap" molasses and water in the ratio of one gallon of molasses to 15 gallons of water, to form a bond setting slowly enough to allow briquetting but then giving initial strength in the briquette.

6. A metallurgical briquette consisting of a mixture of 1000 parts by weight of blast furnace flue dust and sludge having a moisture content of 4–6% by weight, 30 parts Portland cement and 125–156¼ parts by weight, on the basis of said first-named mixture, of molasses and water, the molasses being present in the amount of one gallon to 2–15 gallons of water, to form a bond setting slowly enough to allow briquetting but then giving initial strength in the briquette.

7. The method of making briquettes for use in iron and steel refining processes, comprising the steps of preparing a dry mixture of an iron oxide having a moisture content of 4–14% by weight and selected from the group consisting of natural iron ore fines, flue dust and sludge with 2–5% by weight of Portland cement, preparing a binder solution of water and an adhesive selected from the group consisting of molasses and silicate of soda, moistening said dry mixture with said binder solution in the amount of ½ to 2½ oz. of said solution per pound of iron oxide, the total amount of water in the resultant mixture being not over 18% of said iron oxide, to form a bond setting slowly enough to allow briquetting but then giving initial strength in the briquette, and then pressure molding such resultant mixture to form a self-sustaining briquette.

8. The method of making briquettes for use in iron and steel refining processes, comprising the steps of preparing a dry mixture of 1000 parts by weight iron oxide having a moisture content of 4–14% by weight and selected from the group consisting of natural iron ore fines, flue dust and sludge with 2–5% by weight of Portland cement, preparing a binder solution of water and an adhesive selected from the group consisting of molasses and silicate of soda in the proportion of one gallon of adhesive to 2–20 gallons of water, moistening said dry mixture with 31¼ to 156¼ parts by weight of said binder solution, to form a bond setting slowly enough to allow briquetting but then giving initial strength in the briquette, and then pressure molding the resultant product to form a self-sustaining briquette.

9. The method of making briquettes for use in iron and steel refining processes, comprising the steps of superimposing layers of hot flue dust and wet sludge derived from iron ore blast furnace operations, permitting said superimposed layers of flue dust and sludge to cool thereby reducing the resultant moisture content thereof, mixing said dried and cooled flue dust and sludge with 2–5% by weight of Portland cement, preparing a binder solution of water and molasses in the proportion of one gallon of molasses to 2–15 gallons of water, moistening said first-named mixture with said binder solution in the amount of 2–2½ oz. of said solution per pound of dried flue dust and sludge, the total amount of water in the resultant mixture being not over 18% by weight of said flue dust and sludge present, then pressure molding such resultant mixture to form a self-sustaining briquette.

10. The method of making briquettes for use in iron and steel refining processes, comprising the steps of superimposing layers of hot flue dust having a temperature of 800–1000° F. with layers of sludge having a moisture content of 20–40%, said flue dust and sludge being derived from blast furnace operations, permitting said superimposed layers of flue dust and sludge to cool to atmospheric temperature, thereby reducing the moisture content of the composite mixture to 4–6%, preparing a binder solution of water and molasses in the proportion of one gallon of molasses to 2–15 gallons of water, moistening said mixture of flue dust and sludge with 125–156¼ parts by weight of said binder solution, and then pressure molding the resultant product to form a self-sustaining briquette.

11. The method of making a metallurgical briquette capable of withstanding temperatures of 2500° F. and above without disintegration, comprising the steps of preparing a dry mixture of natural iron ore fines with 2–5% by weight of Portland cement, the moisture content of said iron fines being not over 14% by weight, preparing a binder solution of water and molasses in the proportion of one gallon of molasses to 2–20 gallons of water, mixing said dry mixture with said binder solution in such proportion that the resultant moisture content of the mixture is not over 18% by weight on the basis of said iron ore fines, to form a bond setting slowly enough to allow briquetting but then giving initial strength in the briquette, and then molding the resultant product into a briquette under a pressure of 500 to 2000 lbs. per square inch.

12. The method as defined in claim 7, including the additional step of drying the resultant briquette at a temperature of 150–500° F. to reduce the moisture content thereof to less than 2% by weight of moisture on the basis of the total weight of said iron ore fines present.

FRANK HOLZ.

REFERENCES CITED

The following references are of record in the file of this patent:

UNITED STATES PATENTS

| Number | Name | Date |
| --- | --- | --- |
| 2,205,043 | Mican et al. | June 18, 1940 |
| 1,175,933 | Dery | Mar. 21, 1916 |
| 1,994,379 | Williams et al. | Mar. 12, 1935 |

FOREIGN PATENTS

| Number | Country | Date |
| --- | --- | --- |
| 15,014 | British | Nov. 14, 1884 |
| 256,838 | British | Aug. 19, 1926 |